US009529829B1

(12) United States Patent
Pendharkar (10) Patent No.: US 9,529,829 B1
(45) Date of Patent: Dec. 27, 2016

(54) SYSTEM AND METHOD TO FACILITATE THE USE OF PROCESSED DATA FROM A STORAGE SYSTEM TO PERFORM TASKS (75) Inventor: Niranjan Pendharkar, Maharashtra (IN)

(73) Assignee: Veritas Technologies LLC, Mountain View, CA (US)

(*) Notice: Subject to any disclaimer, the term of this patent is extended or adjusted under 35 U.S.C. 154(b) by 449 days.

(21) Appl. No.: 13/299,681

(22) Filed: Nov. 18, 2011

(51) Int. Cl.
G06F 7/00 (2006.01)
G06F 17/00 (2006.01)
G06F 17/30 (2006.01)
G06F 3/0484 (2013.01)

(52) U.S. Cl.
CPC ....... G06F 17/30303 (2013.01); G06F 3/0484 (2013.01)

(58) Field of Classification Search
USPC ........ 707/609, 654, 661, 692, 737, 741, 827
See application file for complete search history.

(56) References Cited

U.S. PATENT DOCUMENTS

| | | | | |
|---|---|---|---|---|
| 6,560,772 B1* | 5/2003 | Slinger | ................. | G06F 9/4425 709/227 |
| 7,996,371 B1* | 8/2011 | Deshmukh | ........ | G06F 17/30156 707/692 |
| 2004/0024720 A1* | 2/2004 | Fairweather | .................... | 706/46 |
| 2006/0059230 A1* | 3/2006 | Dykas | ................... | G06Q 10/10 709/206 |
| 2006/0161507 A1* | 7/2006 | Reisman | ........................ | 706/12 |
| 2006/0259949 A1* | 11/2006 | Schaefer et al. | ................. | 726/1 |
| 2007/0156730 A1* | 7/2007 | Rothermel et al. | ........... | 707/101 |
| 2007/0179955 A1* | 8/2007 | Croft et al. | ........................ | 707/9 |
| 2007/0185926 A1* | 8/2007 | Prahlad et al. | ............... | 707/202 |
| 2007/0203938 A1* | 8/2007 | Prahlad et al. | ............... | 707/102 |
| 2007/0239818 A1* | 10/2007 | Liou et al. | .................... | 709/201 |
| 2008/0195677 A1* | 8/2008 | Sudhakar et al. | ............. | 707/204 |
| 2008/0294696 A1* | 11/2008 | Frandzel | ....................... | 707/200 |
| 2009/0070356 A1* | 3/2009 | Mimatsu | ........................ | 707/101 |
| 2009/0144285 A1* | 6/2009 | Chatley et al. | ................. | 707/10 |
| 2009/0204649 A1* | 8/2009 | Wong et al. | ................... | 707/204 |
| 2009/0224941 A1* | 9/2009 | Kansal et al. | ........... | 340/870.06 |
| 2009/0319585 A1* | 12/2009 | Gokhale | ....................... | 707/205 |
| 2010/0169273 A1* | 7/2010 | Callanan et al. | ............. | 707/609 |
| 2010/0241615 A1* | 9/2010 | Marshall et al. | ............. | 707/661 |
| 2010/0250624 A1* | 9/2010 | Mayer et al. | ................. | 707/809 |
| 2010/0332479 A1* | 12/2010 | Prahlad et al. | ............... | 707/741 |

(Continued)

*Primary Examiner* — Hosain Alam
*Assistant Examiner* — Nicholas Allen
(74) *Attorney, Agent, or Firm* — Campbell Stephenson LLP (57) ABSTRACT

A system and method for facilitating the use of use processed data from a storage system to perform one or more tasks are disclosed. For example, the method can include identifying data, stored within a storage system, and needed to perform a task. Such data can be stored in a processed form, as a result of such data having been previously processed by the storage system. A determination is made to determine whether the identified data is stored in a processed form. If so, a subsequent determination is made to determine whether the data in the processed form is usable to perform the task. If the data in the processed form is usable to perform the task, a request is generated to request the data in the processed form. The processed data can then be used to perform the task.

22 Claims, 9 Drawing Sheets (56) References Cited

U.S. PATENT DOCUMENTS

| | | | |
|---|---|---|---|
| 2011/0016082 A1* | 1/2011 | Acedo et al. | 707/610 |
| 2011/0016091 A1* | 1/2011 | Prahlad et al. | 707/654 |
| 2011/0016124 A1* | 1/2011 | Isaacson et al. | 707/737 |
| 2011/0035410 A1* | 2/2011 | Takano et al. | 707/790 |
| 2011/0047195 A1* | 2/2011 | Le et al. | 707/827 |
| 2011/0131225 A1* | 6/2011 | Mayer et al. | 707/758 |
| 2012/0124014 A1* | 5/2012 | Provenzano | 707/692 |

\* cited by examiner

SYSTEM AND METHOD TO FACILITATE THE USE OF PROCESSED DATA FROM A STORAGE SYSTEM TO PERFORM TASKS

FIELD OF THE INVENTION

This invention relates to storage systems, and more particularly, to utilizing processed data from a storage system to perform tasks.

DESCRIPTION OF THE RELATED ART

Storage systems sometimes process data, using one or more processing techniques, prior to storing such data. For example, a storage system may perform data compression, data deduplication, data encryption on data prior to storing such data in the storage system's storage units. This type of processing can be performed in order to minimize the storage space required when storing data in the storage system.

However, the processing performed by a storage system on a given set of data is typically performed in a manner that is seamless and, frequently, the details of which are unknown to an application accessing the storage system. However, an application may perform a task that might otherwise benefit from data in a processed form. In such cases, lack of such recognition, as well as information regarding the details of such processing techniques, leads to inefficiencies in the use of computing resources to perform such tasks.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents, and alternatives falling within the spirit and scope of the invention defined by the appended claims.

DETAILED DESCRIPTION

Data can be processed by a storage system in one of several different ways. For example, data can be processed in an effort to reduce the amount of storage space needed to store the data. Data processing can include data compression techniques in which data is compressed according to an algorithm, data deduplication techniques in which duplicate copies of data are removed, and other similar approaches. In other examples, data can also be processed to organize data in a particular order, to encrypt data, to divide a set of data into subsets of data, and so on. Techniques such as data compression, data deduplication, data organization, data encryption, and data division are herein after referred to as data processing techniques.

Data, as it exists prior to processing, is referred to herein as unprocessed data, or data in an unprocessed form. Data, as it exists after processing, is referred to herein as processed data, or data in a processed form. An application may be able to use processed data in a processed form to perform various operations. These operations can include operations such as backups, replication, archiving, and so on. Performing these types of operations are referred to herein as performing tasks.

Figure 1:
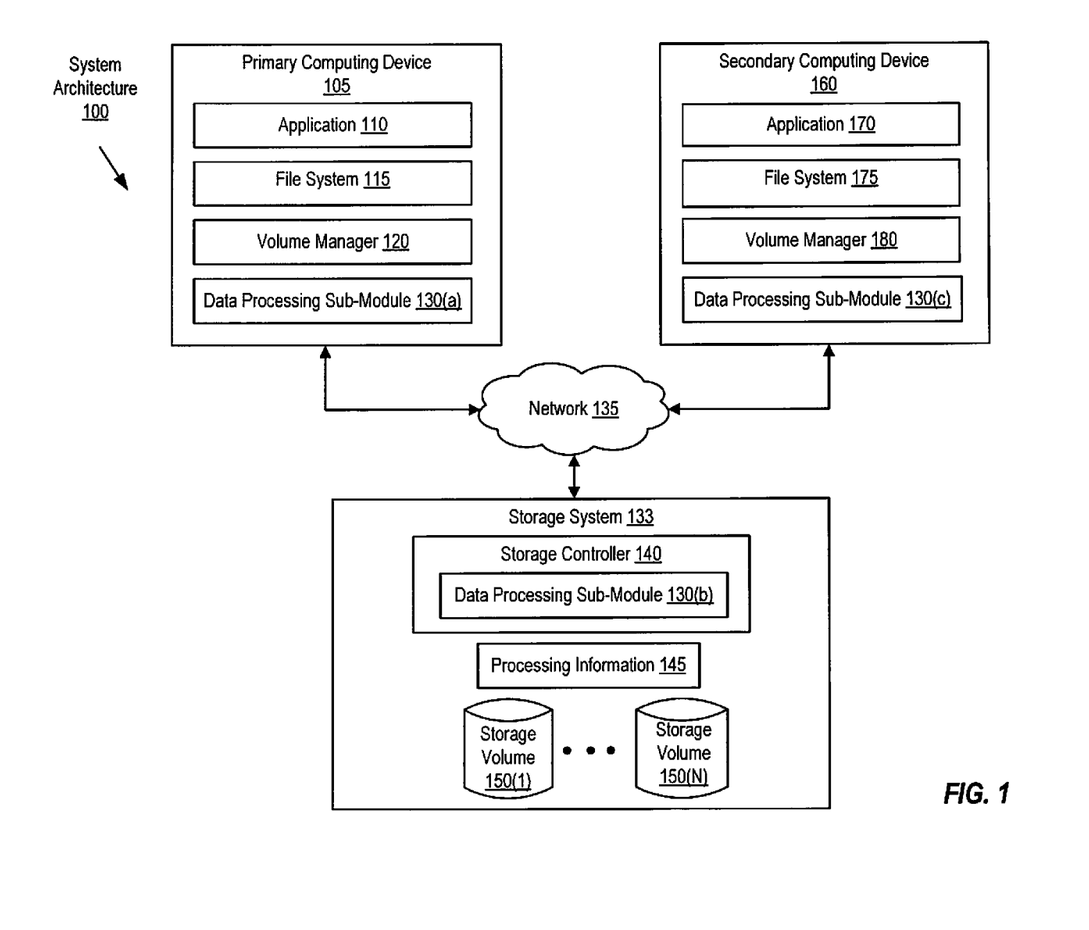
FIG. 1 is a block diagram illustrating system architecture that facilitates the use of processed data to perform tasks, according to one embodiment of the present invention.

FIG. 1 illustrates a system architecture 100, which facilitates the use of processed data to perform tasks. System architecture 100 includes a primary computing device 105. Primary computing device 105 includes an application 110, a file system 115, a volume manager 120, and a data processing sub-module 130(a). Primary computing device 105 is shown as being coupled to a storage system 133 via a network 135. Storage system 133 includes a storage controller 140 (which further includes a data processing sub-module 130(b)), processing information 145, and one or more storage volumes (depicted in FIG. 1 as storage volumes 150(1)-(N)). System architecture 100 further includes a secondary computing device 160. Secondary computing device 160 includes an application 170, a file system 175, a volume manager 180, and a data processing sub-module 130(c). Secondary computing device 160 is also coupled to the same storage system 133 via network 135.

Primary computing device 105 and secondary computing device 160 can be any type of computing device, such as a desktop computer, a laptop computer, a smart-phone, a portable computing device, a server, and so on. Application 110 is executed by primary computing device 105 and application 170 is executed by computing device 160. These applications access data via respective file systems, such as file systems 115 and 175. Applications 110 and 170 can generate and/or consume data organized by the file systems. Applications 110 and 170 can initiate tasks such as replication, backups, organization, encryption, and so on.

File systems 115 and 175 facilitate the organization of data into files and/or folders (e.g., special files that can contain additional files and/or folders) and allow applications, such as applications 110 and 170, to access the organized data. This data can be stored within storage volumes 150(1)-(N). Typically, applications 110 and 170 access data as files and folders presented by file systems 115 and 175. File systems 115 and 175 thus provide organization to the data accessed by applications 110 and 170 allowing such data to be found, retrieved, accessed, and modified within file systems 115 and 175. File systems 115 and 175 can use one of several possible file system architectures for organizing data into files and folders. Examples of file system architectures include File Allocation Table (FAT), New Technology File System (NTFS), Hierarchical File System (HFS), High-Performance File System (HPFS), Unix File System (UFS), Veritas File System (VxFS), and so on.

Volume managers 120 and 180 organize the physical elements of a storage system (e.g., storage system 133) into one or more logical volumes. These logical volumes include the files and folders represented by file systems 115 and 175.

A data processing module 130 (illustrated, for example, as some combination of data processing sub-modules 130(*a*) and 130(*b*), or data processing sub-modules 130(*c*) and 130(*b*), which are referred to in the aggregate as data processing module 130) identifies, analyzes, requests, retrieves, and transmits processed and un-processed data from storage volumes 150(1)-(N). Thus, the functionality provided by a data processing module, such as data processing module 130 can be divided into two sub-modules, data processing sub-module 130(*a*) and data processing sub-module 130(*b*) or data processing sub-module 130(*c*) and data processing sub-module 130(*b*). Alternatively, the functionality of data processing module 130 can be implemented solely in data processing sub-modules 130(*a*) or 130(*c*), or solely in data processing sub-module 130(*b*).

Data processing module 130 identifies data to be used as part of performing a task. Some or all of this data may have been previously processed by storage system 133 prior to the data being stored. Data processing module 130 can perform an analysis of the identified data, or alternatively processing information pertaining to such data, to determine if the data has been previously processed.

Determining whether data has been previously processed can be advantageous to an application performing tasks. This is because such tasks may involve copying and sending data from one location (e.g., primary computing device 105) to another location (e.g., secondary computing device 160) for storage. The amount of data copied and transmitted from one computing device to another affects the amount of computing resources necessary to perform such tasks. For example, if a task involves copying a large amount of data from one computing device to another, the amount of network bandwidth and processing needed to perform such a task can quite significant.

Often, data is processed in some manner by a storage system (e.g., storage system 133), prior to such data being stored. Information regarding the details of such processing, however, is frequently unavailable to an application that performs a task. Thus, data needed for a task is processed prior to storing such data in a storage system (to which a primary computing device is coupled), un-processed when such data is retrieved for the application, transmitted to a secondary computing device, and re-processed by the storage system to which the secondary computing device is coupled, prior to storing such data. However, in some cases, the storage systems may be the same, as is the case in FIG. 1. Alternatively, the primary and secondary computing devices may be coupled to different storage systems, where the two storage systems process data similarly (e.g., using similar processing techniques) prior to storing data.

In these types of scenarios, performing certain tasks can be made more efficient by providing information to an application that indicates the data has been previously processed. This is because an application can use information regarding the details of such processing to determine whether using data in a processed form would be advantageous for completing a task. For example, data processing module 130 can determine that retrieving data in a processed form reduces the amount of data to be transmitted from a primary computing device to a secondary computing device and reduces the amount of network bandwidth consumed in transmitting such data.

If having the data in a processed form is useful for performing a task, data processing module 130 can then specifically request that the data needed for performing the task be provided to the application in its processed form. Doing so leads to a more efficient use of computing resources. This is because, for example, in the case of data compression and deduplication techniques, the application will need less storage space, less network bandwidth when transmitting the processed data, and less processing resources by avoiding the need to de-process (e.g., de-compress) and re-process (e.g., re-compress) data that already existed in a processed form (e.g., was already available in a compressed form).

An application can map the identified data needed for a task to underlying logical unit numbers (LUNs) within storage system 133. Doing so allows storage system 133 to locate and retrieve data within storage volumes 150(1)-(N). The application can further invoke an application programming interface (API) to read the requested data in the processed form. Data processing module can thus generate a request for the data mapped to the specific LUNs in storage system 133.

Data processing module 130 can also generate a request for information describing the processing technique used to process data. This information can indicate whether data has been processed and can indicate what, if any, processing technique and algorithms were employed. For example, the information provided to an application can include an indication that the data has been processed, an indication that the information was processed according to a compression technique, and an indication of the compression algorithm used to compress the data. This type of information can be determined by analyzing the data itself or by analyzing processing information 145 within storage controller 140. An example of processing information 145 can be metadata.

In some cases, data needed for a task may not have been previously processed. However, having the data in a processed form can still advantageous. In these cases, data processing module 130 can request that storage system 133 perform a processing technique on the data, prior to providing such data to the application.

Data processing module 130 receives data retrieved by storage system 133 and prepares to provide such data to the requesting application via an API invoked for receiving such data. Additionally, data processing module 130 can also receive information regarding the details of a processing technique and may prepare to provide such data to the application via the same API or a secondary API dedicated to receiving such information.

Data processing module 130 also receives data (e.g., via data processing subm-module 130(*c*)) from primary computing device 105. This data can be received in a processed or un-processed form. In addition, data processing module 130 can also receive information describing one or more processing techniques applied to the data. For example, data processing module 130 can receive information indicating that the received data has been processed according to a compression technique using a particular compression algorithm. Data processing module 130 can then identify the data (in its current form) and the corresponding information for storage in a secondary storage system.

Network 135 provides a communication path from primary computing device 105 to secondary computing device 160 and storage controller 140 to facilitate transporting data (in a processed or un-processed form) between primary computing device 105, secondary computing device 160, and storage system 133. In some cases, network 135 also provides a communication path to facilitate transporting information describing the details of a processing technique. Network 135 can be any type of network, such as an intranet, a wide area network (WAN), a local area network (LAN), a personal area network (PAN), or the Internet.

As shown, network 135 is illustrated as a single communication medium for providing all types of communication between primary client device 105, secondary computing device 160, and storage system 133. Alternatively, although not shown, network 135 can also be divided into two or more communication mediums. In such cases, at least one communication medium is used to send data in a processed or un-processed form and at least one other communication medium is used to send information describing the details of a processing technique.

As shown, storage system 133 provides a data storage mechanism shared by primary computing device 105 and secondary computing device 160. Storage system 133 includes a storage controller 140, processing information 145, and one or more storage volumes illustrated as storage volumes 150(1)-(N). Examples of storage system 133 include a disk array, just a bunch of disks (JBOD), a redundant array of independent disks (RAID), a DVD/CD jukebox, a tape array, and other types of media.

Storage controller 140 provides a mechanism for organizing, communicating with, and accessing data stored within storage volumes 150(1)-(N). Storage controller 140 organizes data in storage volumes 150(1)-(N) into logical blocks. A LUN is used to represent each logical block. Storage controller 140 typically locates data within a logical block of storage system 133 by referencing a LUN that corresponds to such a logical block.

Storage volumes 150(1)-(N) are storage volumes of a fixed size. In addition, storage volumes 150(1)-(N) provide data storage for primary computing device 105 and secondary computing device 160. Thus, storage volumes 150(1)-(N) provide storage for data and corresponding attributes of the data (e.g., attributes describing the details of the processing techniques applied to such data). Each storage volume 150 can include one or more storage media, such as hard disks, compact discs (CDs), digital versatile discs (DVDs), magnetic tapes, solid state memory, or the like.

Figure 2:
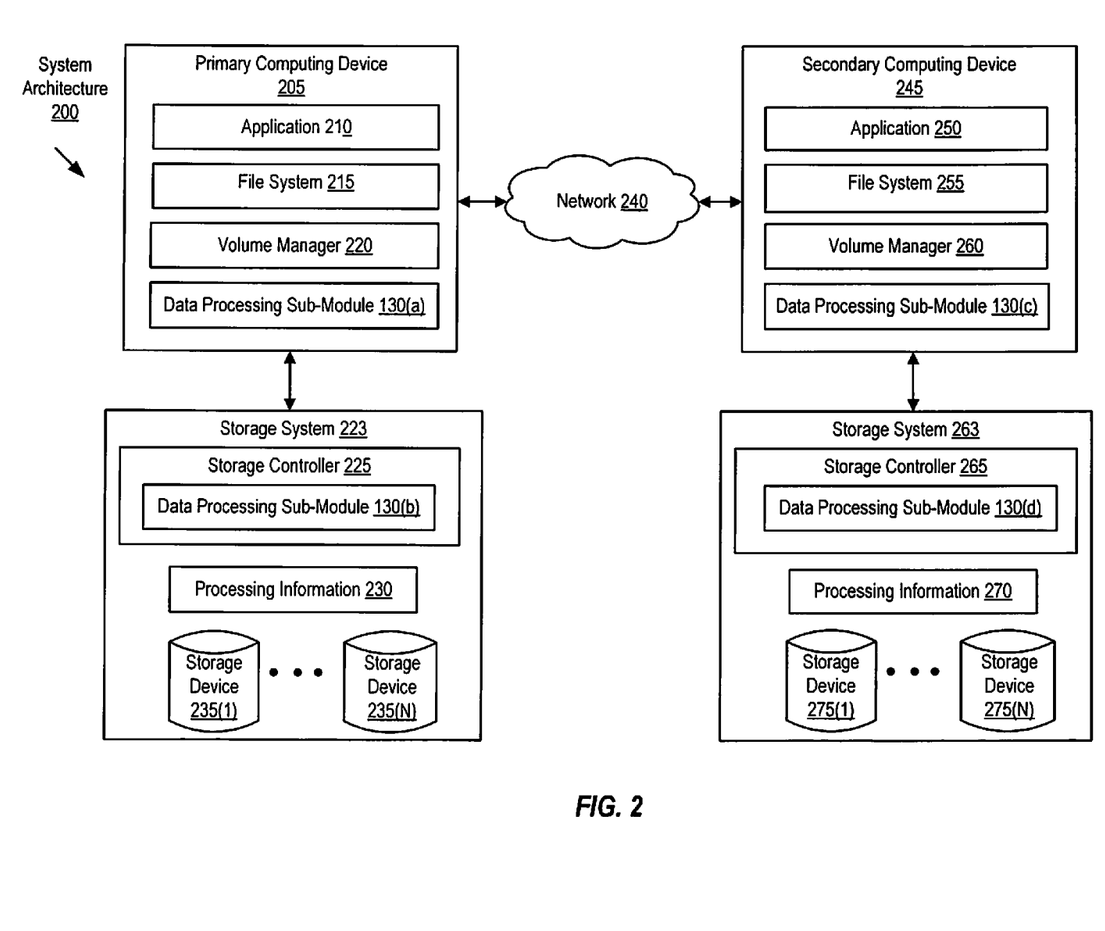
FIG. 2 is a block diagram illustrating alternative system architecture that facilitates the use of processed data to perform tasks, according to one embodiment of the present invention.

FIG. 2 illustrates alternative system architecture that facilitates the use of processed data to perform a task. System architecture 200 is similar to system architecture 100 of FIG. 1. However, system architecture 200 provides for two (or more) storage systems. As shown, primary computing device 205 is coupled to storage system 223, which includes storage controller 225 (which further includes data processing sub-module 130(*b*)), processing information 230, and storage devices 235(1)-(N). Secondary computing device 245 is coupled to storage system 263, which includes storage controller 265 (which further includes data processing sub-module 130(*c*)), processing information 270, and storage volumes 275(1)-(N).

Storage system 223 and storage system 263 can perform similar processing techniques on data to be stored, prior to storing the data. In such cases, a task can be made more efficient by using data in a processed form. This is because processing the same data at storage system 223 and storage system 263 will yield the same processed data in the same processed form. Thus, processed data from storage system 223 can be sent as-is (e.g., in a processed form) from primary computing device 205 to secondary computing device 245.

However, in scenarios where storage system 223 and storage system 263 do not perform similar processing techniques before storing data, the data requested by an application may need to be un-processed by storage system 223 prior to providing such data to an application performing a task.

Figure 3:
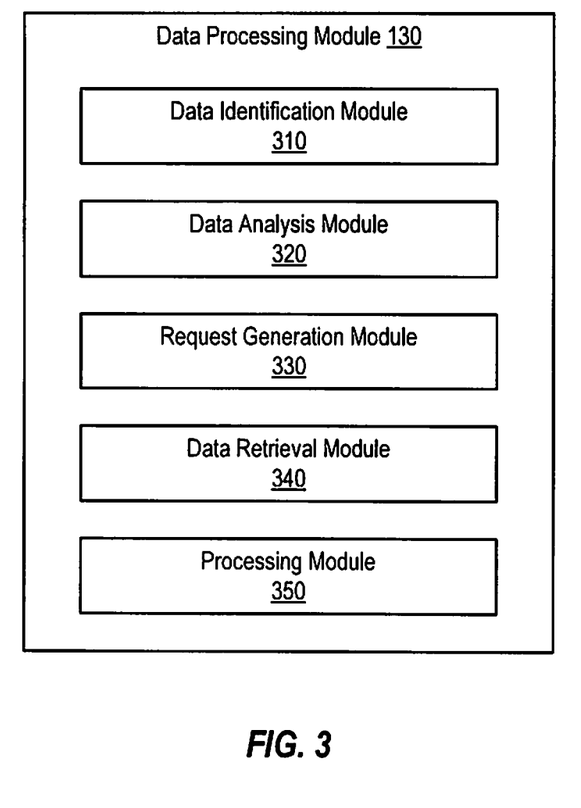
FIG. 3 illustrates a data processing module, according to one embodiment of the present invention.

FIG. 3 illustrates a data processing module 130. Data processing module 130 includes a data identification module 310, a data analysis module 320, a request generation module 330, a data retrieval module 340, and a processing module 350. The functionality provided by data processing module 310 can be further divided into two sub-modules, with one sub-module located within a computing device and a second sub-module located within a storage system.

Data identification module 310 identifies data needed to perform a task. Data needed for a task can be identified based on blocks, data segments, files, and/or applications. The data can then be further identified by mapping the data to underlying LUNs of a storage system. Doing so allows data in logical units to be identified and retrieved. Data analysis module 320 then determines whether the identified data has been previously processed by a storage system. This determination can be made by analyzing the data or by analyzing information (e.g., metadata) describing the details of a processing technique applied to the data.

Request generation module 330 generates requests for retrieving data from a storage system. These requests are requests for data corresponding to underlying LUNs in a storage system. The request may include a request for information indicating that the data should be returned to the requesting application in a processed or un-processed form. Data retrieval module 340 initiates a search of such data. Once located, the data is retrieved and provided to the requesting application. Moreover, data retrieval module 340 can also initiate the storage of data and information (e.g., attributes) describing the processing techniques applied to such data within a secondary storage system. Processing module 350 initiates the processing of data according to a processing technique. Processing module 350 can also initiate a reversal of the processing performed on the data.

Figure 4:
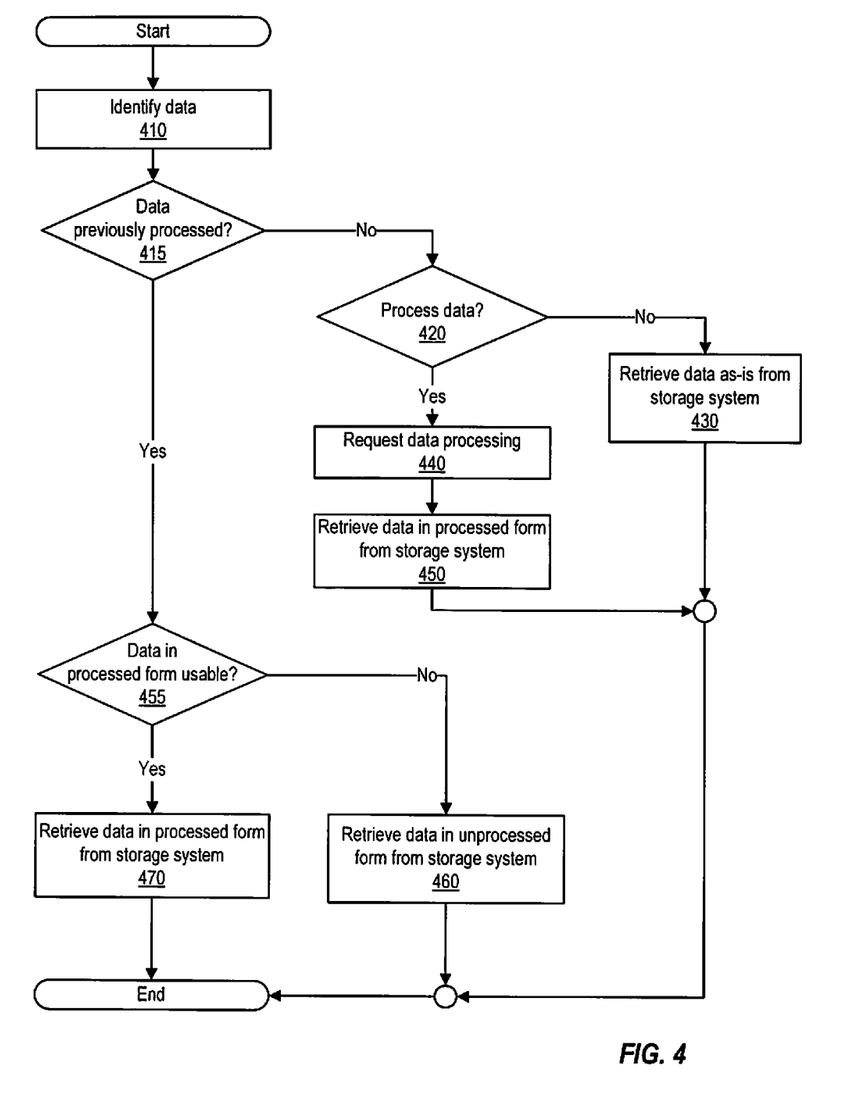
FIG. 4 is a flowchart illustrating an example of a process for analyzing data, according to one embodiment of the present invention.

FIG. 4 is a flowchart illustrating an example of a process for analyzing data. This process can be performed by a data processing module (e.g. such as data processing module 130 of FIG. 3). Data can be analyzed by the process of FIG. 4 to help determine whether data has been previously processed and to determine whether having data in a processed form could be helpful when performing a given task.

The process begins at 410 where the data to be accessed to perform a task is identified. The identified data can include subsets of data, files, or a combination of both. Data identified at 410 can be identified by an application referencing a file system to select certain data subsets or files. In addition, the application can map the identified data to identify corresponding LUNs in a storage system.

Once the data has been identified, the process continues to 415 where a determination is made as to whether the identified data has been previously processed. Determining whether data has been previously processed is a determination that can be made by analyzing the data itself or by analyzing processing information regarding the details of a processing technique applied to the data. Processing information can facilitate identification of a processing technique and a specific algorithm used when performing the processing technique. For example, processing information can indicate that the identified data was previously processed, can indicate that the data was processed according to a compression technique, and can indicate the compression algorithm employed.

In the event that the data has not been processed previously, the process continues to 420 where a determination is made as to whether the data should be processed. Data can be processed at this point if an application determines that using the identified data in its processed form would be advantageous in performing a task. If a determination is made at 420 that the data is not to be processed (e.g., because having the data in the processed form would not be advantageous to perform a task), a determination is made at 430 that the identified data should be retrieved as-is from the storage system. Alternatively, if a determination is made at 420 that the data should be processed (e.g., because having the data in the processed form would be advantageous to perform a task), the process continues to 440 where a request is issued to the storage system requesting that the identified data be processed accordingly. Once the data is processed, a determination is made at 450 that the identified data should be retrieved in the processed form from the storage system.

Referring back to 415, if a determination is made that the data has been previously processed, the process continues to 455. At 455, a determination is made as to whether the data in a processed form can be used in performing a task. For example, data in a processed form can be used to perform a task in cases where a secondary computing device and/or secondary storage system are able to receive data in the processed form and are able to reverse a processing technique to re-create the data in the un-processed form, as needed, as part of completing a task. This might be the case, for example, where a primary and secondary computing devices share the same storage system or where the primary and secondary computing devices and/or the primary and secondary storage devices employ similar processing techniques (e.g., the same techniques for compression, deduplication, encryption, and so on).

If a determination is made at 455 that the data in the processed form cannot be used to perform a task, the process continues to 460 where a determination is made that the data should be retrieved in an un-processed form from the storage system. Alternatively, if a determination is made at 455 that the data in the processed form can be used to perform a task, a determination is made at 470 that the data should be retrieved in a processed form from a storage system. At this point, the process ends.

Figure 5A:
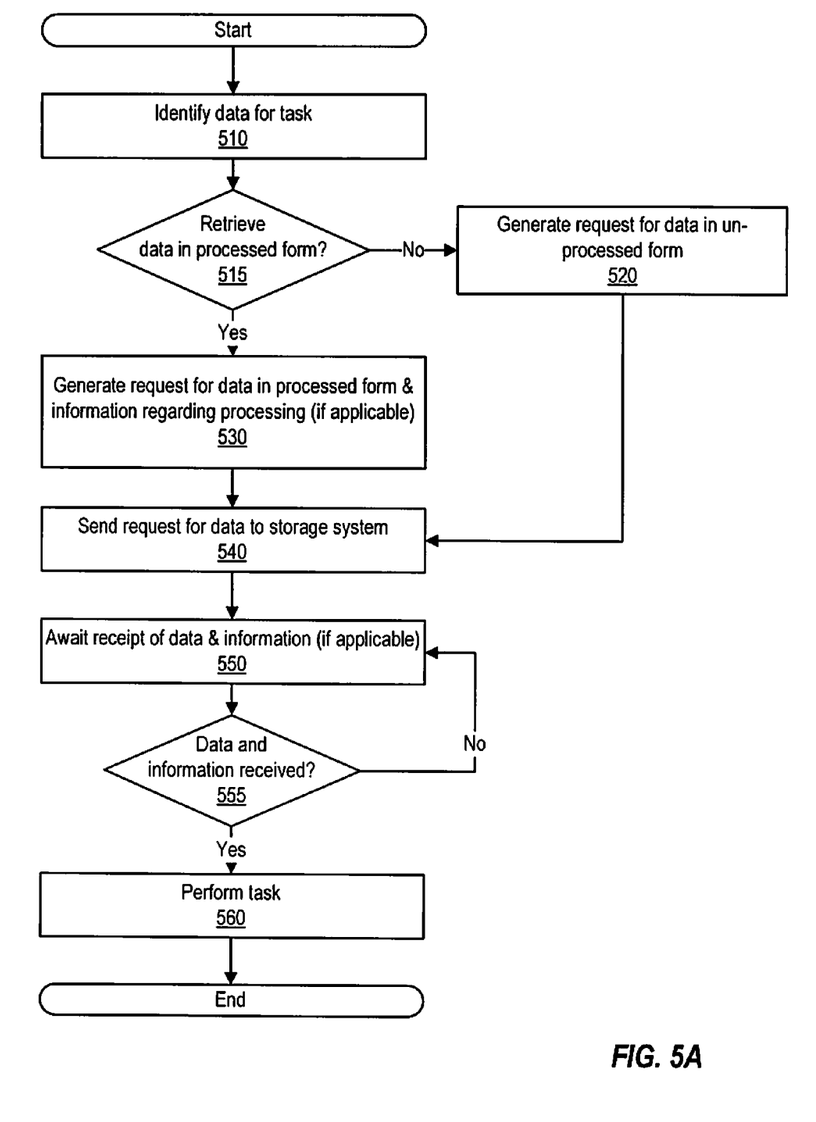
FIG. 5A is a flowchart illustrating an example of a process for requesting data from a storage system, according to one embodiment of the present invention.

FIG. 5A illustrates an example of a process for requesting and receiving data from a storage system. The process of FIG. 5A can be performed by a data process module, such as the data processing module 130 in FIG. 3. The process begins at 510 where the data to be accessed is identified. This data can be identified at a block level, a file level, or an application level. Once identified, the process continues to 515, where a determination is made as to whether the identified data should be retrieved in a processed form.

An analysis of whether data should be retrieved in a processed form can be performed, for example, by the process of FIG. 4. If a determination is made at 515 that the identified data should not be retrieved in a processed form, the process continues to 520. At 520, a request is generated to request the identified data in a processed form.

Alternatively, if the determination made at 515 indicates that the identified data should be retrieved in a processed form, the process continues to 530. At 530, a request is generated to request the identified data in the processed form. An additional request may also be generated to request information regarding a processing technique used to process the data. The request for information regarding the processing technique can be part of the same request for information or it can be a separate request.

The level of information that is needed to describe a processing technique can vary depending on system architecture. For example, if primary and secondary computing devices share the same storage system, the information requested at 530 is fairly minimal. In this case, the information requested at 530 need only describe that a processing technique has been utilized and need only identify the processing technique. The same would apply for an architecture in which the two computing devices are coupled to different storage systems, but the two storage systems employ similar processing techniques. By contrast, if the two computing devices are coupled to different storage systems, the information requested at 530 may need to be more significant. For example, the information regarding the processing technique may need to include an indication that a processing technique has been employed and may also need to provide the processing algorithm used to employ such a technique.

Once a request has been generated at either 520 or 530, the process continues to 540, where the request is sent to a primary storage system for processing. At 550, the process awaits receipt of the requested data and information regarding a processing technique, if applicable. At 555, a determination is made as to whether the data and the optional information requested have been received. If the data and the information have not been received, the process reverts back to 550 where the process continues to wait for the receipt of the data and the information. However, if the data and the information have been received, the process continues to 560, where the task is performed. Performing the task may involve sending the data and the information regarding a processing technique to a secondary computing device for storage within a secondary storage system. At this point, the process ends.

Figure 5B:
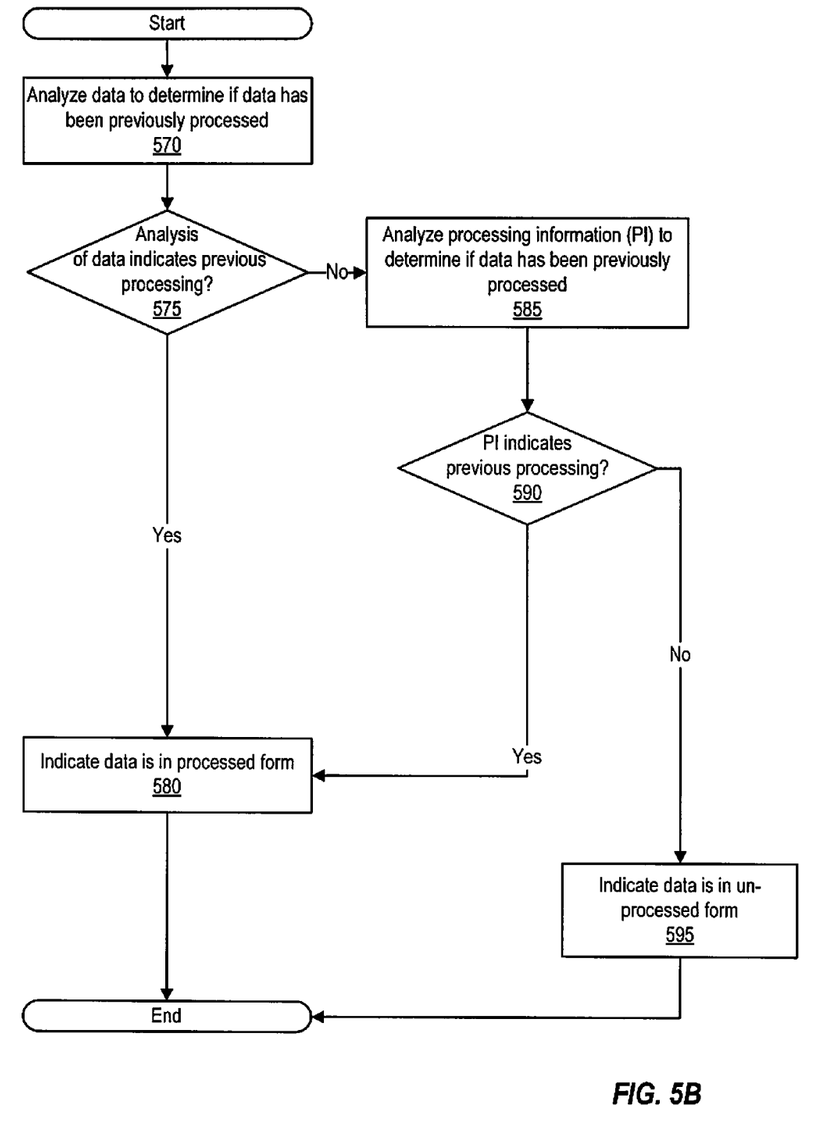
FIG. 5B is a flowchart illustrating an example of a process for determining whether data has been previously processed, according to one embodiment of the present invention.

FIG. 5B illustrates an example of a process for determining whether data has been previously processed. The process of FIG. 5B can be performed by a data process module, such as the data processing module 130 in FIG. 3. In addition, the process of FIG. 5B illustrates an example of the determination analysis performed at 415 in FIG. 4.

The process begins at 570, where identified data is analyzed to determine if the data has been previously processed. The data itself, or information associated with the data, may include an indication that the data has been previously processed. At 575, a determination is made as to whether the analysis of the data indicates that the data has been previously processed. If a determination is made at 575 that the data has been previously processed, an indication is provided to indicate that the data is in a processed form at 580.

Alternatively, if the analysis of the data does not provide an indication that the data has been previously processed, the process continues to 585. At 585, a further analysis is performed to analyze processing information pertaining to the data, to determine if the processing information indicates previous processing of the data. Processing information can be information such as metadata and can include information describing processing techniques and algorithms used to process data. A determination as to whether the processing information indicates previous processing of the data is performed at 590. If a determination is made at 590 that the data has been previously processed, the process continues to 580 where an indication is provided to indicate that the data is in a processed form. On the contrary, if the processing information does not indicate previous processing, the process continues to 595 where an indication is provided to indicate that the data is in an un-processed form. At this point, the process ends.

Alternatively, the process of FIG. 5B can make a determination as to whether data has been previously processed by analyzing processing information first. If no determination can be made from the processing information, a subsequent analysis can then be performed to analyze the data and its form. If the analysis of the processing information and the data are unable to provide an indication as to whether the data has been previously processed, further analysis can also then be performed.

Figure 6:
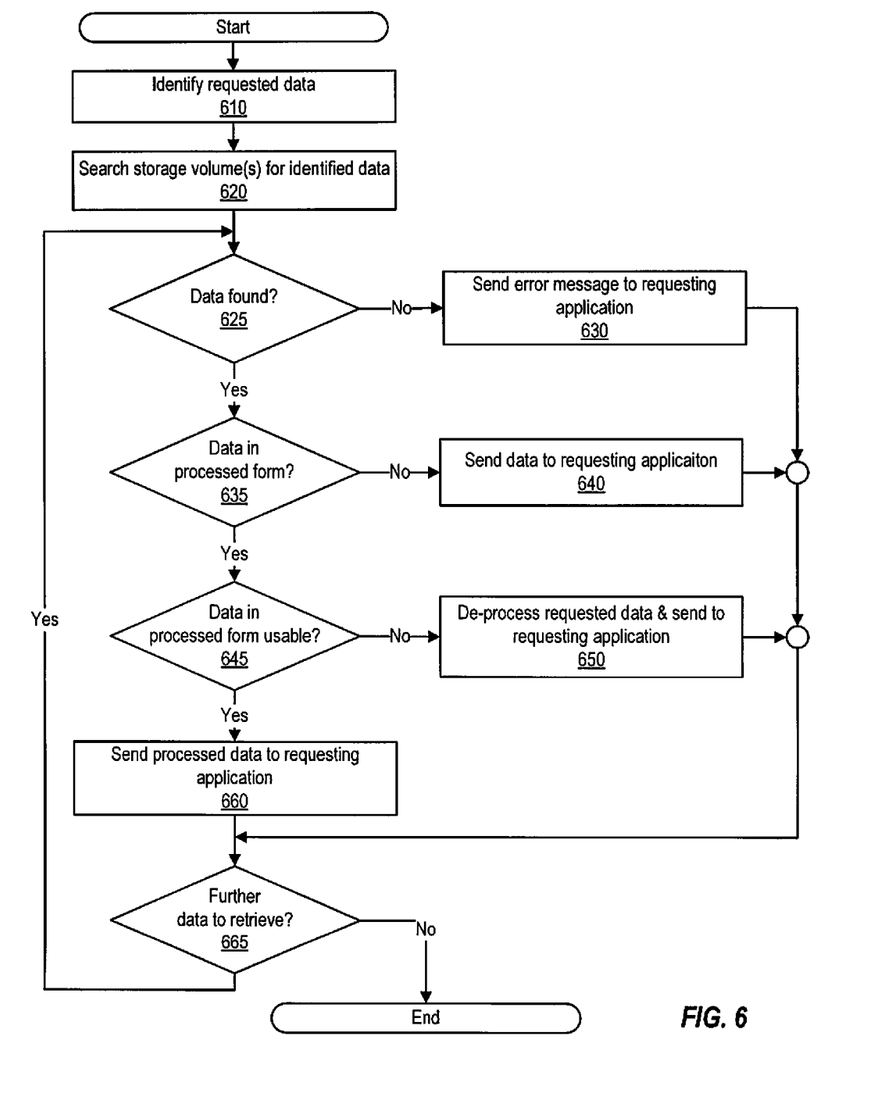
FIG. 6 is a flowchart illustrating an example of a process for retrieving data from a storage system, according to one embodiment of the present invention.

FIG. 6 illustrates a process for retrieving data from a storage system. The process begins at 610 where the data requested by a data processing module is identified. At 620, the identified data is searched for within one or more storage volumes. At 625, a determination is made as to whether the identified data is found within the storage system.

In the event that the data is not found in the storage system, an error message is sent to the requesting application at 630. The process then continues to 665. In the event that the data is found in a storage system, a further determination is made at 635 to determine whether the data found is in a processed form. If the data is not in a processed form, the process continues to 640 where the data is retrieved and sent to the requesting application in its current form. The process then continues to 665. Alternatively, if the data is in a processed form, the process continues to 645 where a determination is made to determine whether the data in the processed form is usable to perform a task.

If a determination is made that the identified data in usable for performing a task, the process continues to 650. At 650, the identified data is un-processed and subsequently sent to the requesting application in the unprocessed form. The process then continues to 665. If the determination at 645 indicates that the data in the processed form is usable to perform a task, the data in its current processed form, along with processing technique information, are sent to the requesting application at 660. The process then continues to 665 where a determination is made as to whether any further requested data remains to be retrieved. If more data is to be retrieved, the process loops back to 625. However, if there is no further data to be retrieved from a storage system, the process ends.

Figure 7:
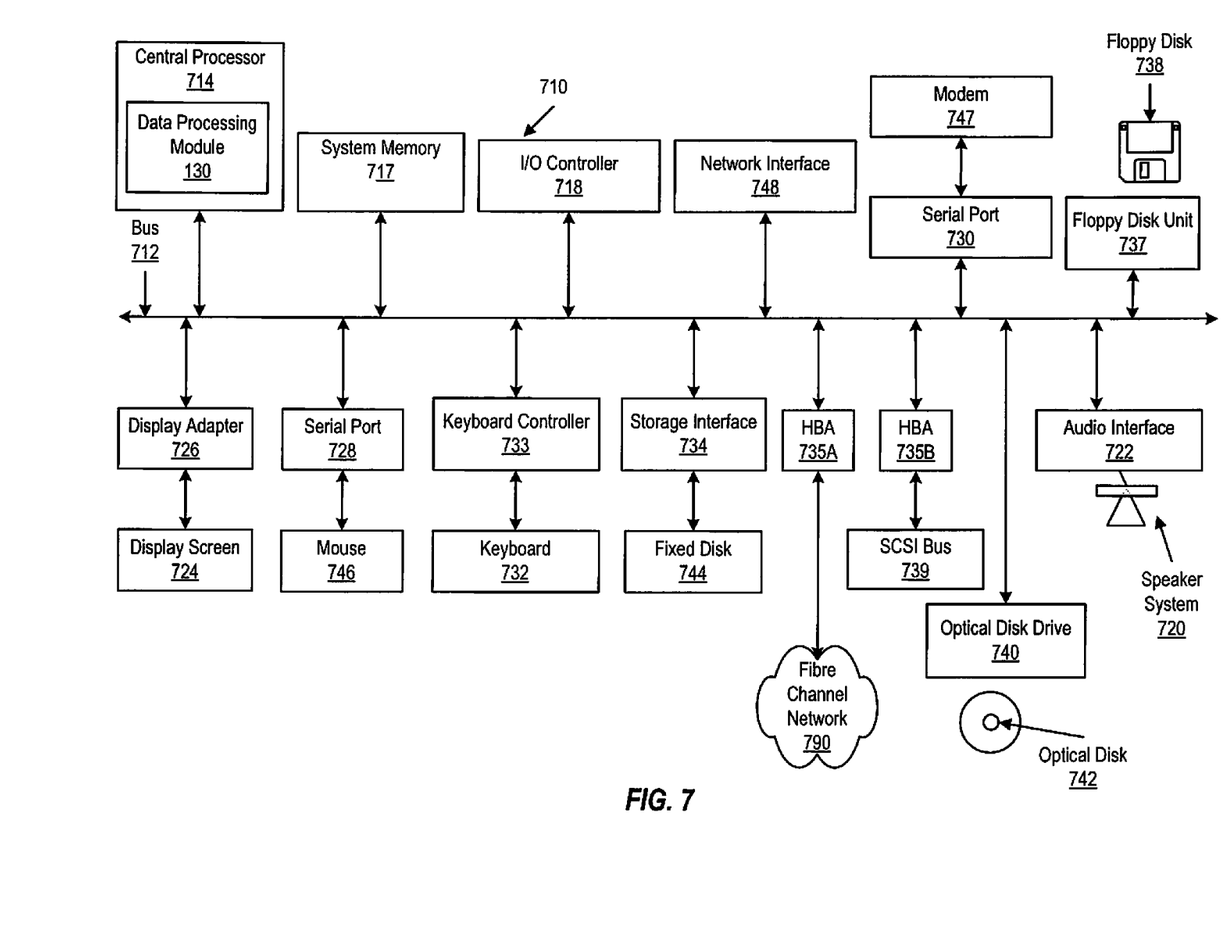
FIG. 7 is a block diagram of a computing system, according to one embodiment of the present invention.

FIG. 7 is a block diagram of a computing system suitable for facilitating the use of processed data to perform efficient tasks. Computer system 710 includes a bus 712 which interconnects major subsystems of computer system 710, such as a central processor 714 (which can also include software such as data processing module 130), a system memory 717 (typically RAM, but which can also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk unit 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which can include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer-readable medium, such as a hard disk drive (e.g., fixed disk 744), an optical drive (e.g., optical disk drive 740), a floppy disk unit 737, or other storage medium. Additionally, applications can be in the form of electronic signals modulated in accordance with the application and data communication technology when accessed via modem 747 or network interface 748.

Storage interface 734, as with the other storage interfaces of computer system 710, can connect to a standard computer-readable medium for storage and/or retrieval of information, such as a fixed disk drive 744. Fixed disk drive 744 can be a part of computer system 710 or can be separate and accessed through other interface systems. Modem 747 can provide a direct connection to a remote server via a telephone link or to the Internet via an internet service provider (ISP). Network interface 748 can provide a direct connection to a remote server via a direct network link to the Internet via a POP (point of presence). Network interface 748 can provide such connection using wireless techniques, including digital cellular telephone connection, Cellular Digital Packet Data (CDPD) connection, digital satellite data connection or the like.

Many other devices or subsystems (not shown) can be connected in a similar manner (e.g., document scanners, digital cameras, and so on). Conversely, all of the devices shown in FIG. 7 need not be present to practice the present invention. The devices and subsystems can be interconnected in different ways from that shown in FIG. 7. The operation of a computer system is readily known in the art and is not discussed in detail in this application. Code to implement the present invention can be stored in computer-readable storage media such as one or more of system memory 717, fixed disk 744, optical disk 742, or floppy disk 738. The operating system provided on computer system 710 can be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention can include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
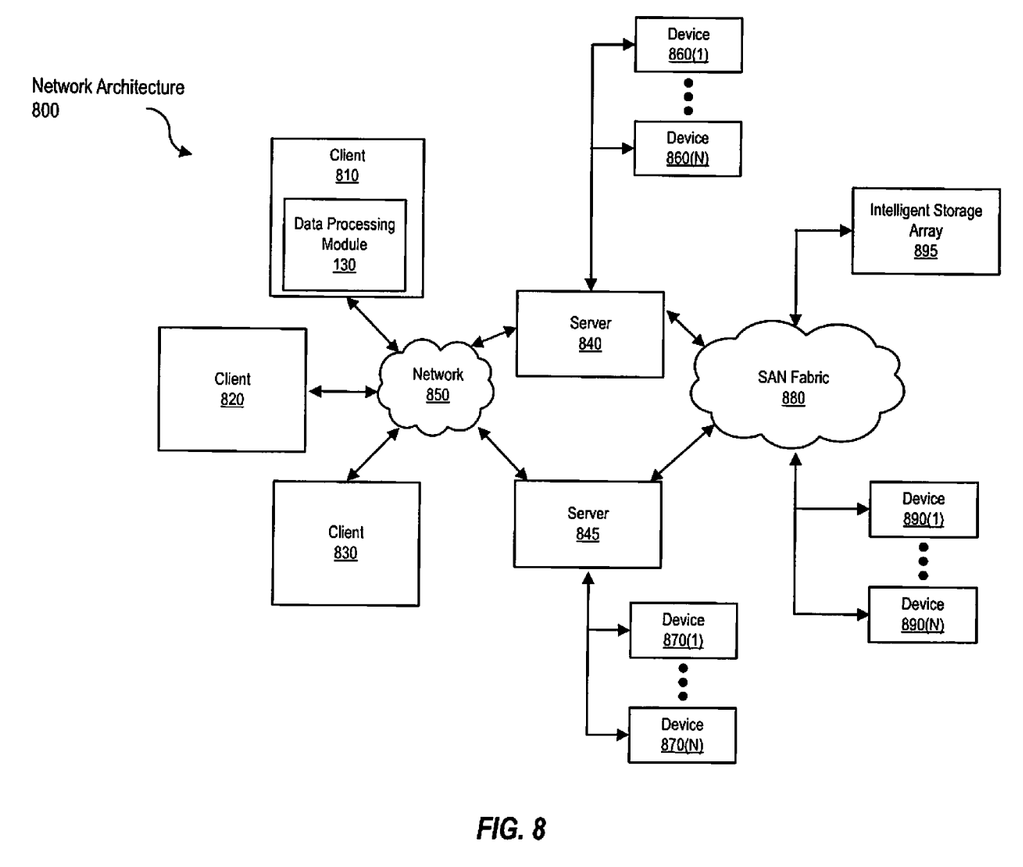
FIG. 8 is a block diagram of a network system, according to one embodiment of the present invention.

FIG. 8 is a block diagram of a network architecture 800 in which client systems 810, 820, and 830 and servers 840 and 845 can be coupled to a network 850. Client systems 810, 820, and 830 generally represent any type or form of computing device or system, such as computing system 710 in FIG. 7. In one example, client system 810 can include a data processing module 130, as shown in FIG. 3.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 can include a data processing module 130, as shown in FIG. 3.

As illustrated in FIG. 8, one or more storage devices 860(1)-(N) can be directly attached to server 840. Similarly, one or more storage devices 870(1)-(N) can be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) can represent network-attached storage (NAS) devices configured to communicate with servers 840 and 845 using various protocols, such as Network File System (NFS), Server Message Block (SMB), or Common Internet File System (CIFS).

Servers 840 and 845 can also be connected to a storage area network (SAN) fabric 880. SAN fabric 880 generally represents any type or form of computer network or architecture capable of facilitating communication between multiple storage devices. SAN fabric 880 can facilitate communication between servers 840 and 845 and a plurality of storage devices 890(1)-(N) and/or an intelligent storage array 895. SAN fabric 880 can also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to computing system 710 of FIG. 7, a communication interface can be used to provide connectivity between each client system 810, 820, and 830 and network 850. Client systems 810, 820, and 830 can be able to access information on server 840 or 845 using, for example, a web browser or other client software. Such software can allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the embodiments disclosed herein can also be encoded as a computer program, stored in server 840, run by server 845, and distributed to client systems 810, 820, and 830 over network 850.

In some examples, all or a portion of the computing devices in FIGS. 1, 2, 3, 7, and 8 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, a data processing module 130 in FIG. 3 can transform processed data into de-processed data and vice versa.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   identifying data, wherein
      the data was previously stored in a first storage system of a first system,
      if the data is in a processed form, the data was processed by the first system, according to a processing technique, before the identifying,
      the first system comprises a first computing device and the first storage system, and
      the first storage system is coupled to the first computing device;
   determining whether the data is in the processed form;
   if the data is in the processed form, determining whether the data in the processed form is usable by an application executing on a second computing device to perform a task, without reversing processing performed by the first system, wherein
      the data is in the processed form as a result of the data being processed according to the processing technique; and
   in response to determining that the data in the processed form is usable by the application executing on the second computing device to perform the task without reversing the processing performed by the first system, generating a request for the data in the processed form, wherein
      the identifying, the determining whether the data is in the processed form, the determining whether the data in the processed form is usable by the application executing on the second computing device without reversing the processing performed by the first system, and the generating the request are performed by a first data processing sub-module of the first computing device, and the data in the processed form is configured to be transmitted to a second data processing sub-module of the second computing device without reversing the processing performed by the first system.

2. The method of claim 1, wherein
the determining whether the data is in the processed form is performed by analyzing processing information corresponding to the data.

3. The method of claim 1, wherein
a second system comprises the second computing device and a second storage system.

4. The method of claim 3, further comprising:
generating another request for information regarding the processing technique.

5. The method of claim 4, further comprising:
transmitting the data in the processed form and the information regarding the processing technique to the second data processing sub-module of the second computing device.

6. The method of claim 5, further comprising:
receiving the data and the information regarding the processing technique at the second storage system; and
storing the data in the processed form and the information regarding the processing technique in the second storage system.

7. The method of claim 3, further comprising:
if the data in the processed form is not usable by the application executing on the second computing device to perform the task, generating another request for the data in an un-processed form.

8. The method of claim 1, wherein the processing technique is at least one of a compression technique, a deduplication technique, an organizational technique, an encryption technique, or a data divisional technique.

9. The method of claim 1, wherein the task is at least one of a backup operation, a replication operation, or an archive operation.

10. A non-transitory computer readable storage medium comprising program instructions executable to cause a first data processing sub-module of a first computing device to:
identify data, wherein
the data was previously stored in a first storage system of a first system,
if the data is in a processed form, the data was processed by the first system, according to a processing technique, before the identifying,
the first system comprises the first computing device and the first storage system, and
the first storage system is coupled to the first computing device;
determine whether the data is in the processed form;
determine whether the data in the processed form is usable by an application executing on a second computing device to perform a task, without reversing processing performed by the first system, if the data is in the processed form, wherein
the data is in the processed form as a result of the data being processed according to the processing technique; and
generate a request for the data in the processed form, in response to determining that the data in the processed form is usable by the application executing on the second computing device to perform the task without reversing the processing performed by the first system, wherein
the data in the processed form is configured to be transmitted to a second data processing sub-module of the second computing device without reversing the processing performed by the first system.

11. The non-transitory computer readable storage medium of claim 10, wherein the program instructions are further executable to:
analyze processing information corresponding to the data to determine whether the data is in the processed form.

12. The non-transitory computer readable storage medium of claim 10, wherein
a second system comprises the second computing device and a second storage system.

13. The non-transitory computer readable storage medium of claim 12, wherein the program instructions are further executable to:
generate another request for information regarding the processing technique, if the data is in the processed form and is usable by the application executing on the second computing device to perform the task.

14. The non-transitory computer readable storage medium of claim 13, wherein the program instructions are further executable to:
transmit the data in the processed form and the information regarding the processing technique to the second data processing sub-module of the second computing device.

15. The non-transitory computer readable storage medium of claim 14, wherein the program instructions are further executable to:
store the data in the processed form and the information regarding the processing technique at the second storage system.

16. A system comprising:
one or more processors; and
memory coupled to the one or more processors, wherein the memory stores program instructions executable by the one or more processors to cause a first data processing sub-module of a first computing device to:
identify data, wherein
the data was previously stored in a first storage system of a first system,
if the data is in a processed form, the data was processed by the first system, according to a processing technique, before the identifying,
the first system comprises the first computing device and the first storage system, and
the first storage system is coupled to the first computing device,
determine whether the data is in the processed form,
determine whether the data in the processed form is usable by an application executing on a second computing device to perform a task, without reversing processing performed by the first system, if the data is in the processed form, wherein
the data is in the processed form as a result of the data being processed according to the processing technique; and
generate a request for the data in the processed form, in response to determining that the data in the processed form is usable by the application executing on the second computing device to perform the task without reversing the processing performed by the first system, wherein the data in the processed form is configured to be transmitted to a second data processing sub-module of the second computing device without reversing the processing performed by the first system.

17. The system of claim 16, wherein the program instructions are further executable to:
analyze processing information corresponding to the data to determine whether the data is in the processed form.

18. The system of claim 16, wherein
a second system comprises the second computing device and a second storage system.

19. The system of claim 18, wherein the program instructions are further executable to:
generate another request for information regarding the processing technique, if the data is in the processed form and is usable by the application executing on the second computing device to perform the task.

20. The system of claim 19, wherein the program instructions are further executable to:
store the data in the processed form and the information regarding the processing technique at the second storage system.

21. The method of claim 3, wherein
the determining whether the data is in the processed form is performed before the first system sends the data towards the second system.

22. The method of claim 1, wherein the determining whether the data is in the processed form comprises:
determining whether the data was processed by the first system.

* * * * *